B. H. SKELLY.
SOLDERLESS PIPE JOINT.
APPLICATION FILED DEC. 19, 1918.
1,317,735.
Patented Oct. 7, 1919.
2 SHEETS—SHEET 1.
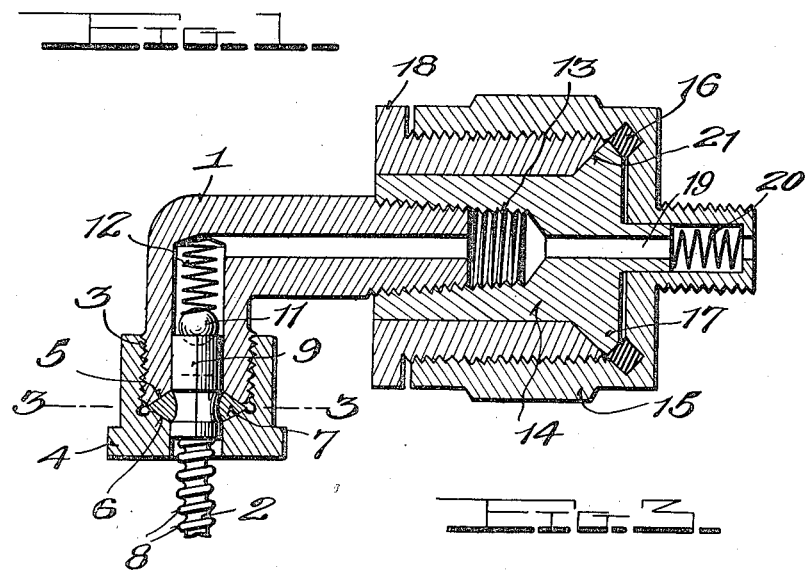
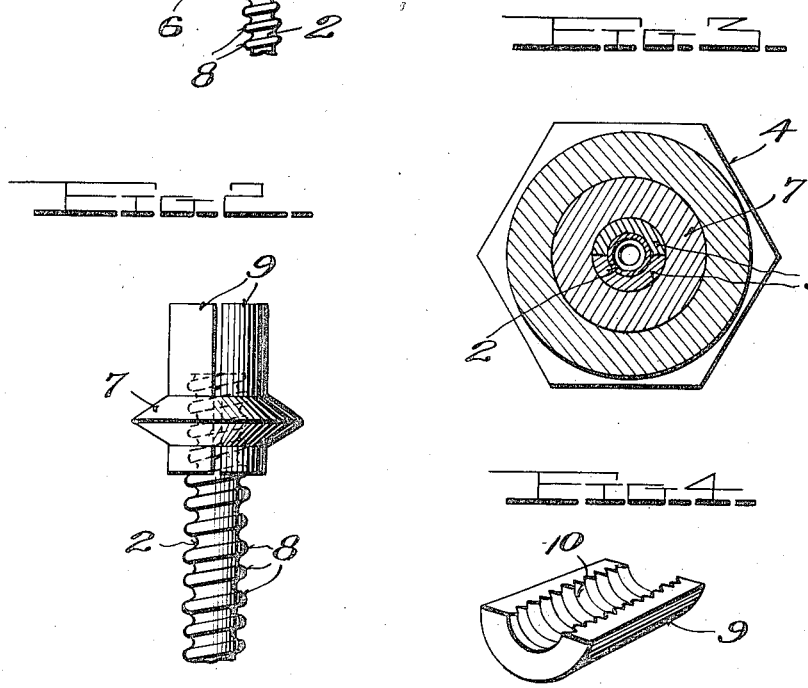
Inventor
B. H. Skelly.
By
Attorney

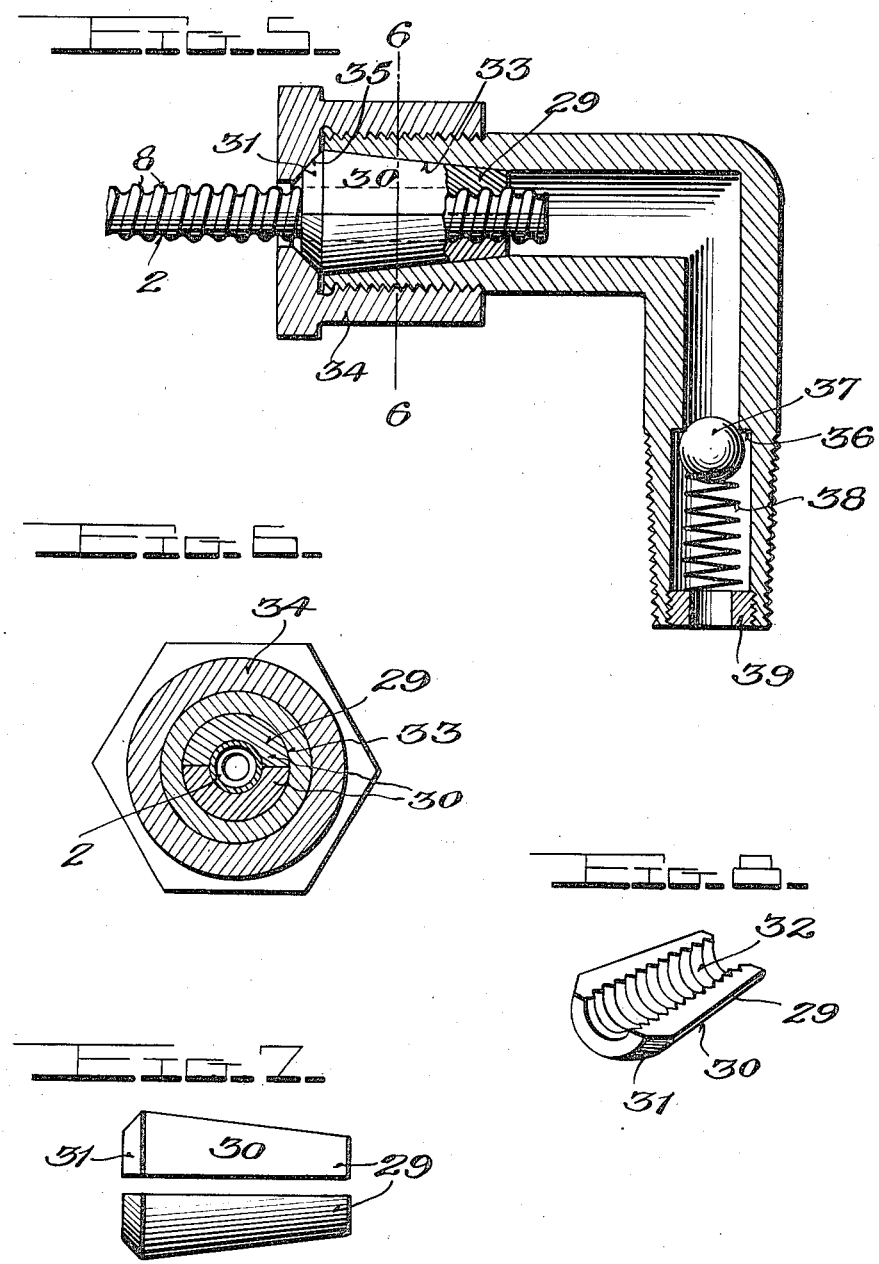

UNITED STATES PATENT OFFICE.

BERNARD H. SKELLY, OF BRIDGEPORT, CONNECTICUT.

SOLDERLESS PIPE-JOINT.

1,317,735.     Specification of Letters Patent.     Patented Oct. 7, 1919.

Application filed December 19, 1918. Serial No. 267,473.

*To all whom it may concern:*

Be it known that I, BERNARD H. SKELLY, a citizen of the United States, residing at the city of Bridgeport, county of Fairfield, State of Connecticut, have invented certain new and useful Improvements in Solderless Pipe-Joints; and I do declare the following to be a full, clear, and exact description of the invention, such as will enable others skilled in the art to which it appertains to make and use the same.

This invention relates to certain new and useful improvements in a solderless pipe joint, and more particularly to a connection between a flexible tubing and a fitting or rigid body of a lubricator.

The principal aim of the invention is to provide a simple, neat and efficient means for fixedly coupling or joining the flexible oil-conducting tubes of an automobile lubricating system to a fixed rigid fitting or other body, without the employment of solder.

A further object is to provide a leak-tight joint embodying a soft metal or like packing member with means for compressing the same about the flexible tube and forcing it to a firm seating within the fitting.

Further, the invention resides in the features of construction described in detail in the specification and defined succinctly in the appended claims.

In the drawings:—

Figure 1 is a longitudinal section through my improved joint, the soft metal sleeve and valve being depicted in elevation;

Fig. 2 is a detailed elevation of the soft metal jacket or sleeve about the flexible tube;

Fig. 3 is a transverse section through the joint on line 3—3 of Fig. 1;

Fig. 4 is a perspective of one section of the soft metal sleeve;

Fig. 5 is a longitudinal section through a modified form of joint, parts being shown in elevation;

Fig. 6 is a transverse section therethrough on line 6—6 of Fig. 5;

Fig. 7 is a side elevation of the soft metal sleeve embodied in the modified construction, the sections having been slightly spaced apart; and Fig. 8 is a perspective view of one of the sections.

Referring more in detail to the drawing, the numeral 1 designates a fitting, such as an elbow to which is connected the flexible oil-conducting tube 2 that enters one end of the elbow, the latter being externally screw threaded, as at 3 to receive the compression or clamping nut 4. This end of the elbow is formed with an inwardly beveled seat 5 and the nut is likewise formed with a beveled seat 6 convergent, relative to the seat 5, and coöperable therewith in clamping a ring 7 therebetween.

The oil tube 2 is wound with wire 8 and leads from the force feed lubricator (not shown). A split tubular sleeve 9 made of lead or other soft metal has its sections preferably formed with internal threads 10 cast in them to correspond with the spiral windings of the lubricant-conducting tube around which the sections are positioned and held by means of the encircling ring 7 which keeps them initially together with their threads in engagement with the spiral wire 8. This ring of soft brass has its opposite faces beveled off and extends between the seats 5 and 6 to be engaged and compressed thereby.

The nut 4 is first strung on the tube and the halves or sections 9 are then placed around the end of the tube and retained in threaded interlock by the compressible ring 7. With one beveled face of the latter engaged on beveled seat 5 on the end of the elbow, the clamping nut is then applied, the force with which it is driven causing the ring 7 to be crushed inwardly against the sections 9. Being of soft metal these sections will also be disrupted and forced inwardly to unite firmly with the tube as well as the ring itself so that not only is the tube anchored and securely held but a packing between the parts is also provided that will positively prevent leakage of oil.

The inner end of the split tubular sleeve 9 extends beyond the tube 2 and forms a seat for the ball valve 11 that is held on its seat by a coiled spring 12 within the elbow. This valve prevents oil from passing to the bearing to be lubricated except when the lubricant is subjected to pressure by force from the main lubricator.

The opposite end of the elbow is tapered and screw threaded to fit a threaded tapered opening 13 in a swivel plug 14. An oil cup 15 is equipped with a packing ring 16 on which the base flange 17 of the swivel plug is held by means of a hollow sleeve nut 18 that is threaded into the cup. Oil passage 19 leads from the opening 13 through the plug and cup, a spring 20 being arranged therein to urge a tight sliding joint between the outer beveled face of flange 17 and its seat 21 at the inner end of the sleeve nut 18.

This swivel construction constitutes the subject matter described and claimed by me in another application for patent.

The soft metal parts 9 very efficiently serve their purpose but other suitable material such as a good grade of felt, that gives good packing results might also be utilized. Furthermore, the initial threading of the sections 9 to correspond with the spiral winding of the tube might also be dispensed with since the compressing, crushing action of the nut 4 on the ring 7 and sections 9 will cause the latter to firmly embed themselves between the windings. Obviously, the sections 9 could be unitary and applied to the oil tube in tube form.

The improved joint is inexpensive, costing approximately one-fifth as much as a soldered joint and without the muss and operations accompanying the soldering process.

In the modified construction, the brass retaining ring 7 is omitted and the soft metal sections 29 are formed with a long tapered or beveled face 30 and a short beveled face 31. Each section may also be cast or formed with threads 32 to correspond with the windings 8 of the oil tube 2 so as to fit around the latter and then inserted in the end of the elbow with the long attenuated end foremost. To conformably receive the sleeve 29 the elbow is formed with a long beveled seat 33 and the clamping nut 34, which has threaded engagement with the elbow, is provided with a short beveled face 35. Consequently, when the clamping or compression nut 34 is screwed onto the elbow fitting, the soft metal packing sections will be crushed or forced into the spiral windings of the tube and also fill up whatever space there is that may exist at the outer end of the elbow or its beveled seat, thus insuring a liquid-tight joint throughout.

In this modification the tube may project beyond the packing since the latter does not serve as a valve seat in this construction, because the opposite end of the elbow is counterbored to provide a seat 36 for the ball valve 37 to engage under the influence of a spring 38 which is compressed between the valve and a nut 39 in the outer end of the elbow.

This construction will also prevent the flow of lubricant except when forced by pressure from the main lubricator. The joint is absolutely liquid-tight and does not require the employment of solder.

While the bevel 6 is efficient and preferable, it may be omitted, since the clamping nut 4 without this bevel will, when driven, operate to crush the sleeve 9 firmly against the flexible tube and will effect sufficiently oil tight joints.

While this invention is illustrated and described in connection with a flexible tube that has spiral windings on its exterior it will be obvious that the flexibility of the tube has nothing to do with the operation or utility of the invention. Also the spiral winding is merely incidental to the flexible tube since it keeps the latter from breaking when bent or moved to and fro, and the present invention is equally applicable for effecting a solderless joint between a plain non-flexible tube and a hollow fixture.

Therefore, I do not wish to be limited to the use of my invention in connection with either a flexible tube or a tube having spiral windings.

I claim:—

1. A solderless pipe joint for tubes, comprising, the combination with a tube, of a hollow rigid member formed at one end with a beveled seat, a compression nut threaded on said end and likewise formed with a beveled seat, and a soft packing fitted about the tube and extending between the beveled seats to be clamped therebetween and forced into tight fitting relation to said tube.

2. A solderless pipe joint for tubes, comprising, in combination with a tube, of a hollow rigid member formed at one end with a beveled seat, a compression nut threaded on said end and likewise formed with a beveled seat, and a sectional packing member formed of soft metal having a part fitting between the seats whereby on tightening of the nut the packing member will be compressed into a tight fitting relation to the tube.

3. A solderless joint comprising a flexible tube having spiral windings, a fixture formed at one end with a beveled seat, a packing sleeve of soft metal formed internally with threads to receive the tube windings, and means coöperable with the beveled seat to compress the packing sleeve into tight fitting relation with both the tube and fixture.

4. A solderless joint comprising a tube, a fixture formed at one end with a beveled seat, a split tubular sleeve constructed of soft metal and positioned around the tube, a compression nut engaged with the fixture and formed with a beveled seat opposing the first seat, and a soft brass ring encircling the split sleeve and formed with oppositely beveled faces extending between and fitting the beveled seats to be compressed therebetween for forcing the sleeve and ring into a tight fit with the tube.

5. A solderless joint comprising two hollow members one within the other, the outer member formed with a long beveled seat, a split packing sleeve divided into sections fitting around the inner member and formed with a long tapered face engaging the seat, the outer end of the sleeve formed with a short beveled face, and a compression nut engaged with the outer member and formed with a short beveled seat to engage the short beveled face of the sleeve.

6. A solderless joint comprising two hollow members one within the other, the outer member formed with a beveled seat, a compression nut engaged with the outer member and likewise formed with a beveled seat, a soft metal packing sleeve engaging about the inner member and extending beyond the end thereof to form a valve seat, a spring pressed valve engaging the valve seat, and means engaged between the beveled seats for compression thereby into the packing sleeve between its ends to force the adjacent metal thereof against the inner member.

7. A solderless joint comprising two hollow members one within the other, the outer member formed with a beveled seat, a compression nut engaged with the outer member and likewise formed with a beveled seat, a sectional sleeve surrounding the inner member, and an encircling retaining ring about the sections of the sleeve engaging between the beveled seats.

8. A solderless joint for securing flexible tubes to fixtures, comprising a flexible tube, a hollow fixture having a mouth with a long bevel, a soft metal tubular sleeve-like structure surrounding said tube and having a tapered outer surface fitting within said beveled mouth, and a clamping nut driven on said fixture against said structure, whereby the latter will be firmly crushed against said tube and anchored thereto.

In testimony whereof I affix my signature.

BERNARD H. SKELLY.